US006427169B1

(12) United States Patent
Elzur

(10) Patent No.: US 6,427,169 B1
(45) Date of Patent: Jul. 30, 2002

(54) PARSING A PACKET HEADER

(75) Inventor: Uri Elzur, Zichron Yaakov (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/364,096

(22) Filed: Jul. 30, 1999

(51) Int. Cl.[7] .............................................. G06F 13/00
(52) U.S. Cl. ..................................... 709/224; 370/401
(58) Field of Search ................................. 709/200, 201, 709/224, 227, 229, 231, 232, 233, 234, 235; 370/235, 392, 389, 401, 474

(56) References Cited

U.S. PATENT DOCUMENTS

| | | | | |
|---|---|---|---|---|
| 5,058,110 A | * | 10/1991 | Beach et al. | 370/464 |
| 5,228,083 A | * | 7/1993 | Lozowick et al. | 713/160 |
| 5,235,644 A | * | 8/1993 | Gupta et al. | 713/161 |
| 5,500,860 A | * | 3/1996 | Perlman et al. | 370/401 |
| 5,594,869 A | * | 1/1997 | Hawe et al. | 370/474 |
| 5,917,821 A | * | 6/1999 | Gobuyan et al. | 370/392 |

OTHER PUBLICATIONS

Chandranmenon G P et al: Trading Packet Headers for Packet Processing IEEE/ACM Transactions on Networking, US, IEEE Inc., New York, vol. 4, No. 2, Apr. 1, 2996, pp. 141–152.

* cited by examiner

*Primary Examiner*—Moustafa M. Meky
(74) *Attorney, Agent, or Firm*—Trop, Pruner & Hu, P.C.

(57) ABSTRACT

A packet is received that includes a header. The header indicates at least one characteristic that is associated with a layer of a protocol stack. The packet is parsed with a network controller to extract the characteristic(s), and a handle is passed from the network controller to the protocol stack to indicate the characteristic(s). The computer system may be capable of executing software of a protocol stack to extract the characteristic(s) of the packet, and the apparatus may include an interface and a circuit. The interface may be adapted to receive the packet, and the circuit may be adapted to parse the header to extract the characteristic(s) without causing the computer to execute the software and process the packet based on the extracted characteristic(s).

29 Claims, 10 Drawing Sheets

PARSING A PACKET HEADER

BACKGROUND

The invention relates to parsing a packet header.

Referring to FIG. 1, a server 12 may communicate with a client 10 by transmitting packets 8, or frames, of information over a network 18 pursuant to a network protocol. As an example, the network protocol may be a Transmission Control Protocol/Internet Protocol (TCP/IP), and as a result, the client 10 and server 12 may implement protocol stacks, such as TCP/IP stacks 17 and 19, respectively. For the client 10 (as an example), the TCP/IP stack 17 conceptually divides the client's software and hardware protocol functions into five hierarchical layers 16 (listed in hierarchical order): an application layer 16a (the highest layer), a transport layer 16b, a network layer 16c, a data link layer 16d and a physical layer 16e (the lowest layer).

More particularly, the physical layer 16e typically includes hardware (a network controller, for example) that establishes physical communication with the network 18 by generating and receiving signals (on a network wire 9) that indicate the bits that make up the packets 8. The physical layer 16e recognizes bits and does not recognize packets, as the data link layer 16d performs this function. In this manner, the data link layer 16d typically is both a software and hardware layer that may, for transmission purposes, cause the client 10 to package the data to be transmitted into the packets 8. For purposes of receiving packets 8, the data link layer 16d may, as another example, cause the client 10 to determine the integrity of the incoming packets 8 by determining if the incoming packets 8 generally conform to predefined formats and if the data of the packets comply with cyclic redundancy check (CRC) codes or other error correction codes of the packets. The data link layer 16d may also perform address filtering.

The network layer 16c typically is a software layer that is responsible for routing the packets 8 over the network 18. In this manner, the network layer 16c typically causes the client 10 to assign and decode Internet Protocol (IP) addresses that identify entities that are coupled to the network 18, such as the client 10 and the server 12. The transport layer 16b typically is a software layer that is responsible for such things as reliable data transfer between two endpoints and may use sequencing, error control and general flow control of the packets 8 to achieve it. The transport layer 16b may cause the client 10 to implement a specific protocol, such as the TCP protocol or a User Datagram Protocol (UDP), as examples. The application layer 16a typically includes network applications that, upon execution, cause the client 10 to generate and receive the data of the packets 8.

Referring to FIG. 2, a typical packet 8 may include an IP header 20 that indicates such information as the source and destination IP addresses for the packet 8. The packet 8 may include a security header 23 that indicates a security protocol (e.g., an IPSec protocol) and attributes of the packet 8, and the packet 8 may include a transport protocol header 22 (a TCP or an UDP protocol header, as examples) that is specific to the transport protocol being used. As an example, a TCP protocol header might indicate a TCP destination port and a TCP source port that uniquely identify the applications that cause the client 10 and server 12 to transmit and receive the packets 8. The packet 8 may also include a data portion 24, the contents of which are furnished by the source application; and a trailer 26 that is used for encryption purposes.

Referring to FIG. 3, as an example, a TCP protocol header 22a may include a field 30 that indicates the TCP source port address and a field 32 that indicates the TCP destination port address. Another field 34 of the TCP protocol header 22a may indicate a sequence number that is used to concatenate received packets of an associated flow. Packets 8 that have the same IP addresses, transport layer port addresses and security attributes are part of the same flow, and a sequence number (described below) indicates the order of a particular packet 8 in that flow.

In this manner, the data bytes of the flow may be sequentially numbered even though the data bytes may be divided among the different packets 8 of the flow. To accomplish this, a field 34 of the TCP protocol header 22a may indicate a sequence number that identifies the first byte number of the next packet 8. Therefore, if the last byte of data in a particular packet 8 has a byte number of "1000," then the sequence number for this packet 8 is "1001" to indicate the first byte in the next packet 8 of the flow.

The TCP protocol header 22a may include a field 38 that indicates a length of the header 22a, a field 44 that indicates a checksum for the bytes in the header 22a and a field 40 that indicates control and status flags. For example, the field 40 may indicate whether the packet 8 is the first or last packet 8 of a particular flow. As another example, the field 40 may indicate whether or not a particular packet 8 carries acknowledgment information that is used for purposes of "handshaking." In this manner, an acknowledgment packet typically does not (but may) include data, and the receiver of a flow transmits an acknowledgment packet after the receiver receives a predetermined number (two, for example) of packets from the sender. In this manner, the receipt of an acknowledgment packet by the sender indicates that a predetermined number of packets were successfully transmitted. The TCP protocol header 22a may also include a field 43 that indicates a maximum number of bytes (called a "window") that the sender may transmit before receiving an acknowledgment packet that at least indicates some of the bytes were successively received. Other fields are possible, such as a checksum field 44 and an urgent pointer field 42, as examples. The urgent pointer field 42 indicates an offset from the current sequence number at which urgent data is located.

As an example, software that is associated with the transport 16b and network 16c layers, when executed by a processor of the client 10, typically causes the client 10 to parse the information that is indicated by the protocol header 22 to facilitate additional processing of the packet 8. However, the execution of the software may introduce delays that impede the communication of packets 8 between the client 10 and the server 12.

Thus, there is a continuing need to address one or more of the problems stated above.

SUMMARY

In one embodiment of the invention, a method for use with a computer system includes receiving a packet that includes a header. The header indicates at least one characteristic that is associated with a layer of a protocol stack. The packet is parsed with a network controller to extract the characteristic(s), and the handle is passed from the network controller to indicate the characteristic(s).

In another embodiment, an apparatus is used with a computer system that is capable of executing software of a protocol stack to extract at least one characteristic of a packet. The apparatus includes an interface and a circuit. The interface is adapted to receive the packet, and the packet includes a header that indicates the characteristic(s). The circuit is adapted to parse the header to extract the characteristic(s) of the packet without causing the computer to execute the software and process the packet based on the extracted characteristic(s).

In yet another embodiment, a computer system includes a processor and a peripheral device. The processor is adapted to execute software of a network stack to extract at least one characteristic of a packet. The packet includes a header that indicates the characteristic(s). The peripheral device is adapted to receive the packet and parse the header to extract the characteristic(s). The peripheral device is also adapted to at least partially process the packet based on the extracted characteristic(s).

DETAILED DESCRIPTION

Figure 1:
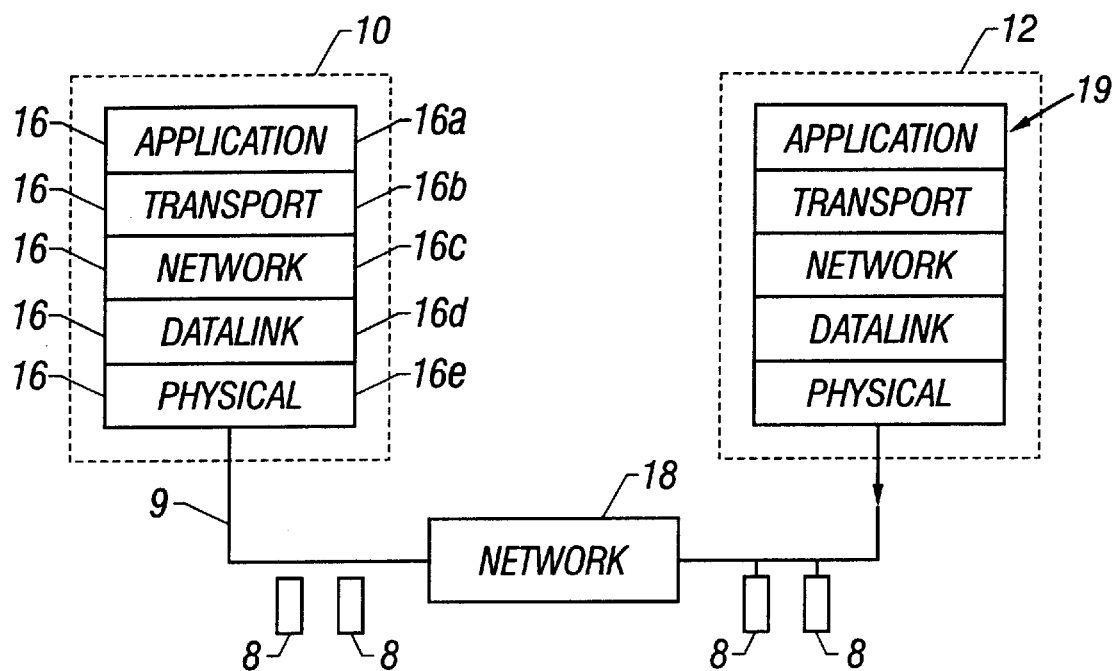
FIG. 1 is a schematic diagram of a network of computers according to the prior art.
Figure 2:
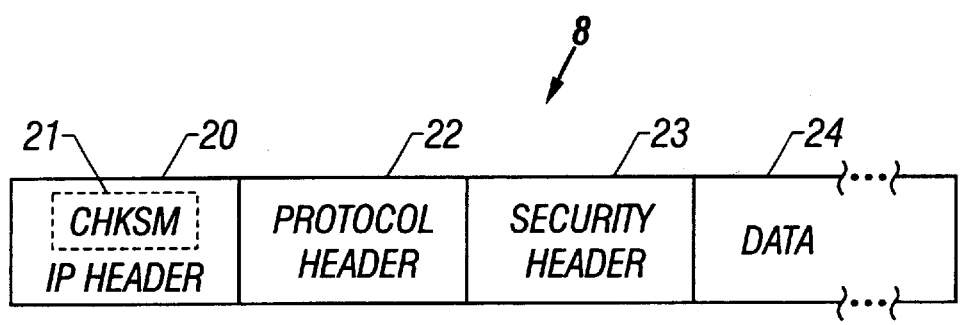
FIG. 2 is a schematic diagram of a packet transmitted over the network shown in FIG. 1.
Figure 3:
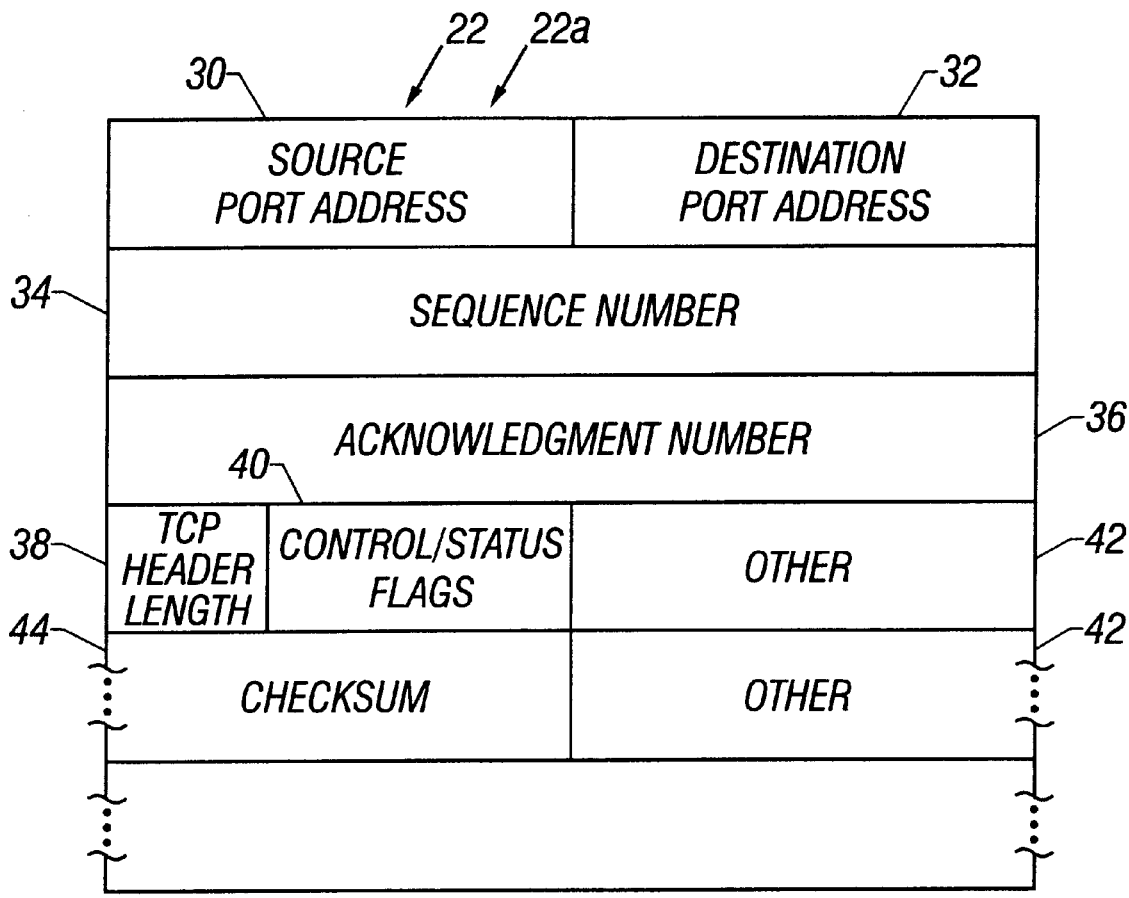
FIG. 3 is an illustration of a protocol header of the packet of FIG. 2.
Figure 4:
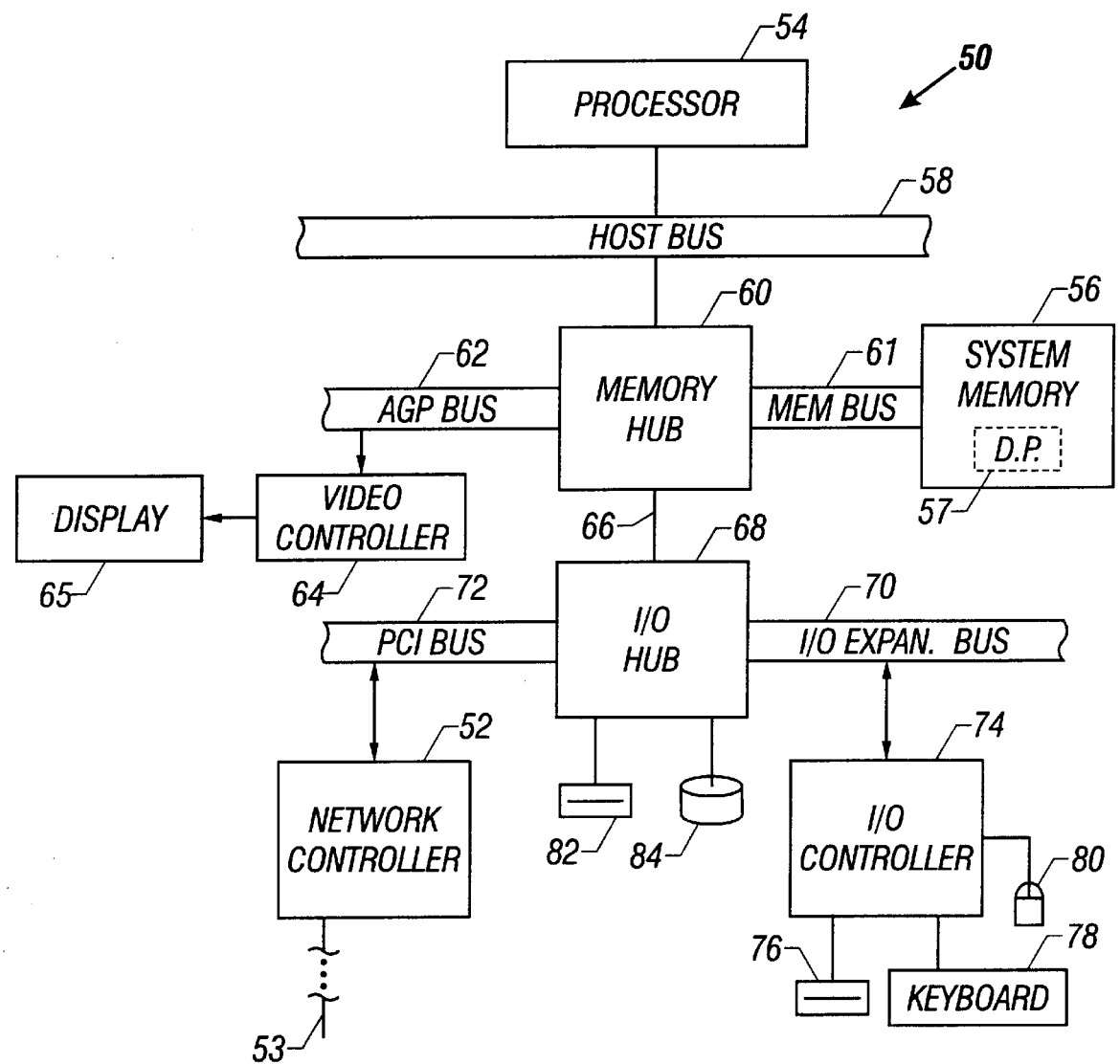
FIG. 4 is a schematic diagram of a computer system according to an embodiment of the invention.

Referring to FIG. 4, an embodiment 50 of a computer system in accordance with the invention includes a network controller 52 (a local area network (LAN) controller, for example) that communicates packets of information with other networked computer systems via at least one network wire 53. Unlike conventional network controllers, the network controller 52 is adapted to perform functions that are typically implemented by a processor 54 (a central processing unit (CPU), for example) that executes one or more software layers (a network layer and a transport layer, as examples) of a network protocol stack (a TCP/IP stack, for example). As an example, these functions may include parsing headers of incoming packets to obtain characteristics (of the packet) that typically are extracted by execution of the software layers.

The characteristics, in turn, may identify an application that is to receive data of the packet. In this context, the term "application" may generally refer to a user of one of the protocol layers (layers 1, 2, 3 or 4, as examples). Due to this identification by the network controller 52, the network controller 52 (and not a software layer of the stack) may directly control the transfer of the packet data to a buffer (in a system memory 56) that is associated with the application. As a result of this arrangement, data transfers between the network controller 52 and the system memory 56 may take less time and more efficiently use memory space, as further described below.

Figure 5:
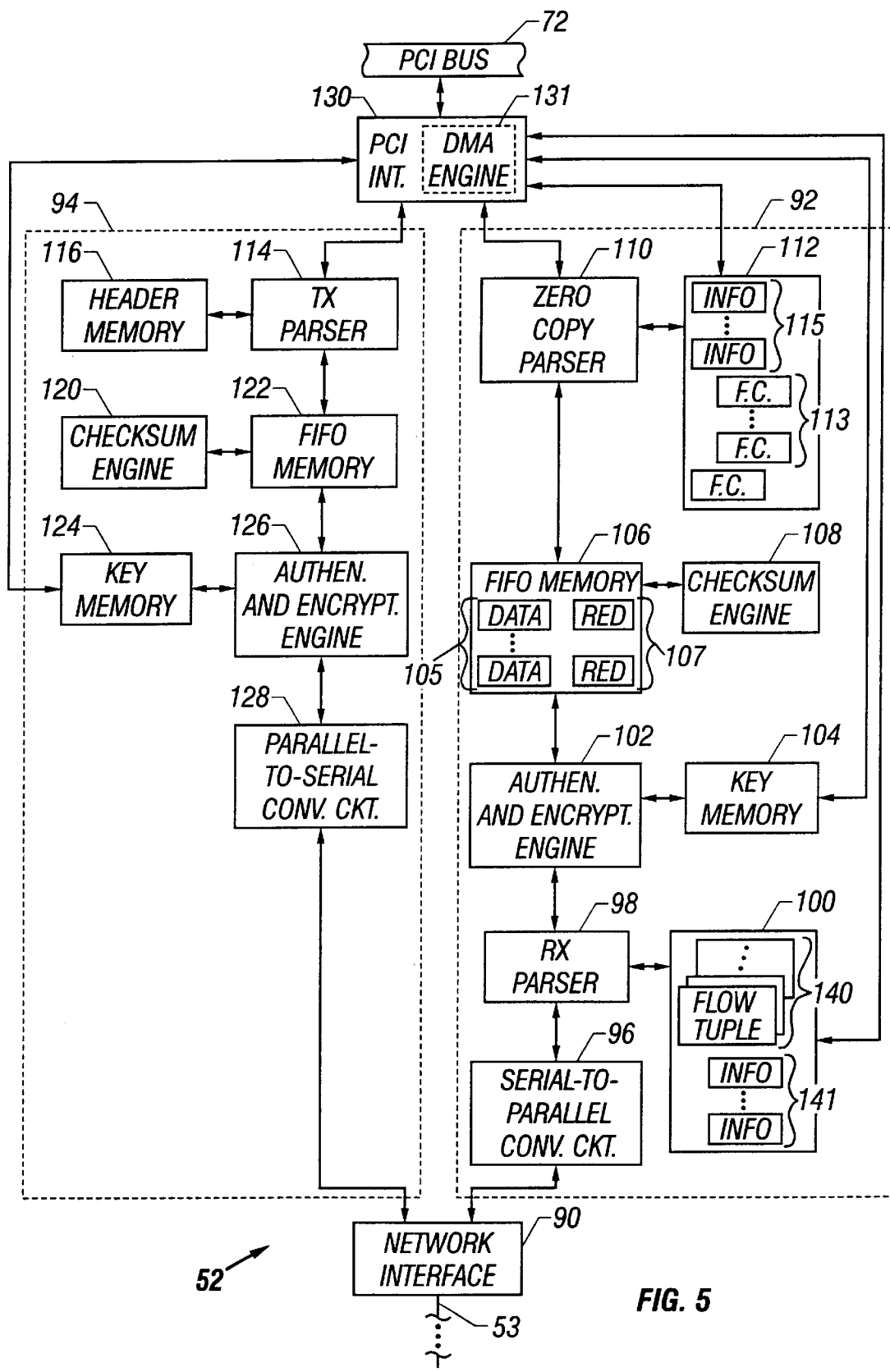
FIG. 5 is a schematic diagram of a network controller of FIG. 4.

Referring to FIG. 5, the network controller 52 may include hardware, such as a receive path 92, to perform functions to process packets that are received from the network. For example, the receive path 92 may include a receive parser 98 to parse a header of each packet to extract characteristics of the packet, such as characteristics that associate a particular flow with the packet. Because the receive path 92 may be receiving incoming packets from many different flows, the receive path 92 may include a memory 100 that stores entries, called flow tuples 140. Each flow tuple 140 uniquely identifies a flow that is to be parsed by the network controller 52. As further described below, the flows indicated by the flow tuples 140 may be changed by the processor's execution of a driver program 57.

The receive parser 98 may use the stored flow tuples 140 in the following manner. First, the receive parser 98 may interact with the memory 100 to compare parsed information from the incoming packet with the flow tuples 140 to determine if the incoming flow is one of the flows indicated by the flow tuples 140, i.e., the receive parser 98 determines if a "flow tuple hit," occurs. If a flow tuple hit occurs, the receive parser 98 may parse packets that are associated with the flow, and other circuitry (of the controller 52) may also process the packet based on the detected flow, as further described below.

Figure 6:
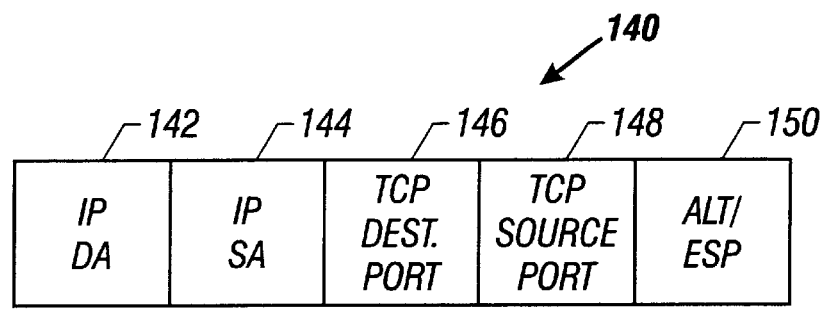
FIG. 6 is an illustration of a flow tuple stored in memory of the network controller of FIG. 5.

Referring also to FIG. 6, each flow tuple 140 may include fields that identify characteristics of a particular flow. As an example, in some embodiments, at least one of the flow tuples 140 may be associated with a Transmission Control Protocol (TCP), a User Datagram Protocol (UDP) or a Real-time Transport Protocol, as examples. The flow tuple 140 may include a field 142 that indicates an internet protocol (IP) destination address (i.e., the address of the computer system to receive the packet); a field 144 that indicates an IP source address (i.e., the address of a computer system to transmit the packet); a field 146 that indicates a TCP destination port (i.e., the address of the application that caused generation of the packet); a field 148 that indicates a TCP source port (i.e., the address of the application that is to receive the packet); a field 150 that indicates security/authentication attributes of the packet; and a security parameter index (SPI) field 152 that may be used by the computer system 50 to identify a secure flow. Other flow tuples 140 may be associated with other network protocols, such as a User Datagram Protocol (UDP), for example.

In some embodiments, the receive parser 98 may use a subset of the flow tuple 140 to identify a particular flow. For example, in some embodiments, the receive parser 98 may use the fields 142, 150 and 152 to identify a flow tuple hit. As described further below, the fields 142, 144, 146 and 148 may be used to identify specific types of flow, such as, zero copy flows.

The above references to specific network protocols are intended to be examples only and are not intended to limit the scope of the invention. Additional flow tuples 140 may be stored in the memory 100 and existing flow tuples 140 may be removed from the memory 100 via execution of the driver program 57 by the processor 54. In some embodiments, the memory 100 may also store information fields 141. Each field 141 may be associated with a particular flow tuple 140 and may indicate, for example, a handler that identifies (for the network protocol stack) the flow and a pointer to a buffer of a system memory 56, as further described below.

If the receive parser 98 recognizes (via the flow tuples 140) the flow that is associated with the incoming packet, then the receive path 92 may further process the packet. In some embodiments, the receive parser 98 may indicate (to other circuitry of the network controller 52 and eventually to a network protocol stack) recognition of the flow associated with a particular packet and other detected attributes of the packet.

If the receive parser 98 doesn't recognize the flow, then the receive path 92 passes the incoming packet via a Peripheral Component Interconnect (PCI) interface 130 to software layers of a network protocol stack (a TCP/IP stack, for example) of the computer system 50 for processing. The PCI Specification is available from The PCI Special Interest Group, Portland, Oreg. 97214. Other bus interfaces may be used in place of the PCI interface 130 to interface the network controller 52 to buses other than a PCI bus. In some embodiments, the computer system 50 may execute an operating system that provides at least a portion of some layers (network and transport layers, for example) of the protocol stack.

In some embodiments, even if the receive parser 98 recognizes the flow, additional information may be needed before receive path 92 further processes the incoming packet 52. For example, an authentication/encryption engine 102 may authenticate and/or decrypt the data portion of the incoming packet based on the information that is indicated by the IP security header of the packet. In this manner, if the IP security header indicates that the data portion of the incoming packet is encrypted, then the engine 102 may need a key to decrypt the data portion.

For purposes of providing the key to the engine 102, the network controller 52 may include a key memory 104 that stores different keys that may be indexed by the different associated flows, for example. Additional keys may be stored in the key memory 104 by the processor's execution of the driver program 57, and existing keys may be removed from the key memory 104 by the processor's execution of the driver program 57. In this manner, if the engine 102 determines that the particular decryption key is not stored in the key memory 104, then the engine 102 may submit a request (via the PCI interface 130) to the driver program 57 (see FIG. 4) for the key. In this manner, the driver program 57, when executed by the processor 54, may cause the processor 54 to furnish the key in response to the request and interact with the PCI interface 130 to store the key in the key memory 104. In some embodiments, if the key is unavailable (i.e., the key is not available from the driver program 57 or is not stored in the key memory 104), then the engine 102 does not decrypt the data portion of the packet. Instead, the PCI interface 130 stores the encrypted data in a predetermined location of the system memory 56 (see FIG. 4) so that software of one or more layers of the protocol stack may be executed to decrypt the data portion of the incoming packet.

Figure 7:
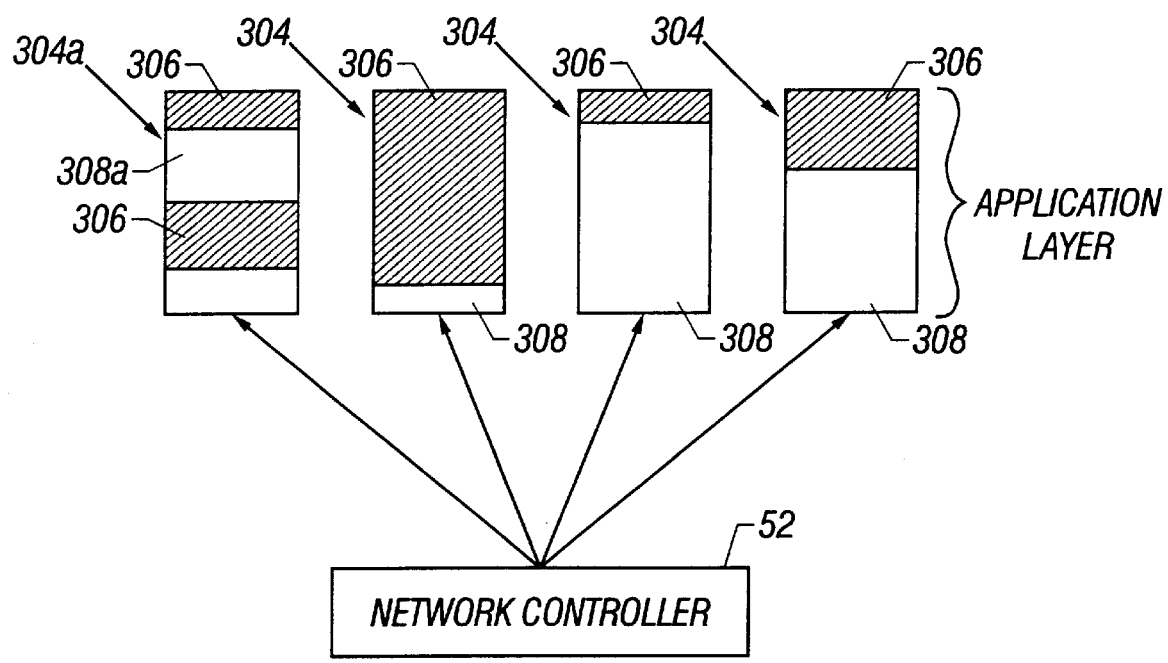
FIG. 7 is a schematic diagram illustrating the transfer of packet data according to an embodiment of the invention.

After the parsing, the processing of the packet by the network controller 52 may include bypassing the execution of one or more software layers that are associated with the network protocol stack. For example, the receive path 92 may include a zero copy parser 110 that, via the PCI interface 130, may copy data associated with the packet into a memory buffer 304 (see FIG. 7) that is associated with the application layer. In this manner, an application may have one or more associated buffers for receiving the packet data.

The operating system creates and maintains the buffers 304 in a virtual address space, and the operating system reserves a multiple number of physical four kilobyte (KB) pages for each buffer 304. The operating system also associates each buffer 304 with a particular application so that the application may use the data stored in the buffer 304.

As described below, to accomplish the direct transfer of packet data from the network controller 52 to the buffers 304, the operating system causes the processor 54 to provide a pointer (to the network controller 52) that points to one of the buffers 304. The indicated buffer 304 may be a buffer allocated by the application for its sole use or a buffer the operating system hands to the network controller 52 to be associated with one of the predefined flows that are to be serviced with zero copy. In the latter case, the operating system will later re-map the buffer to the virtual address space of the application. The zero copy parser 110 uses the flow handle to associate the frame with a zero copy buffer and copy the data directly into that buffer. The above-described arrangement of transferring data into the buffers 304 is to be contrasted to conventional arrangements that may use intermediate buffers (that are associated with the data link and/or the transport layer) to transfer packet data from the network controller to application layer buffers, as described below.

Figure 8:
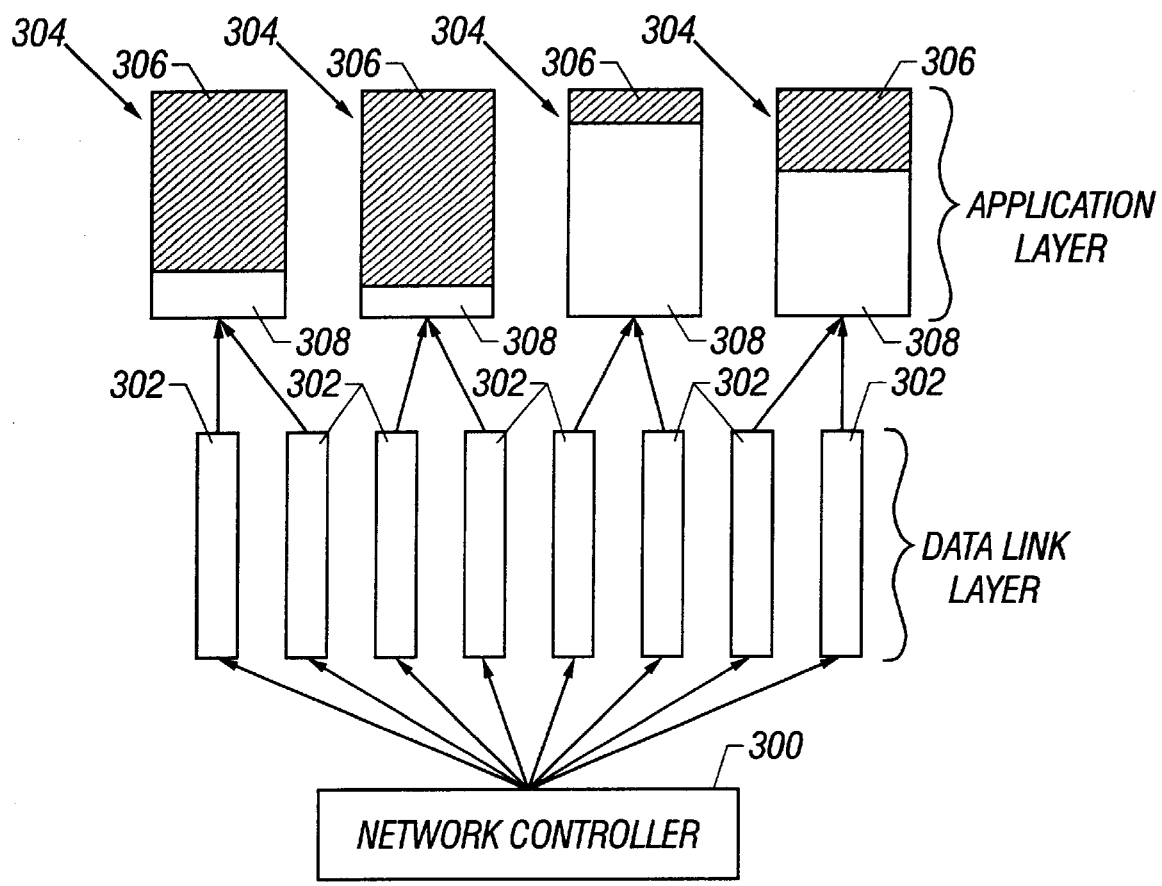
FIG. 8 is a schematic diagram illustrating the transfer of packet data between layers of the network stack of the prior art.

Referring to FIG. 8, for example, a typical network controller 300 does not directly transfer packet data into the buffers 304 because the typical network controller 300 does not parse the incoming packets to obtain information that identifies the flow or destination application. Instead, the typical network controller 300 transfers the data portion of the packet into packet buffers 302 that are associated with the data link layer. In contrast to the buffers 304, each buffer 302 may have a size range of approximately 1518 bytes (as an example), i.e., the approximate size range of data for a particular packet. The execution of the transport layer (by the processor 54) subsequently associates the data with the appropriate applications and causes the data to be transferred from the buffers 302 to the buffers 304.

Referring back to FIG. 7, in contrast to the conventional arrangement described above, the network controller 52 may use the zero copy parser 110 to bypass the buffers 302 and copy the data portion of the packet directly into the appropriate buffer 304. To accomplish this, the zero copy parser 110 (see FIG. 5) may receive an indication of the TCP destination port (as an example) from the receive parser 98 that, as described above, extracts this information from the header. The TCP (or other layer 4 protocol, e.g., RTP) destination port uniquely identifies the application that is to receive the data and thus, identifies the appropriate buffer 304 for the packet data. Besides transferring the data portions to the buffers 304, the zero copy parser 110 may handle control issues between the network controller 52 and the protocol stack and may handle cases where an incoming packet is missing, as described below.

The zero copy parser may use a flow context memory 112 to store flow context fields 113 that indicates the particular flows in which zero copying is to be performed. Each context field 113 may be associated with an information field 115 (also stored in the flow context memory 112) that indicates, for example, handles that are associated with the various flows indicated by the flow context fields 113 and other information like addresses, for example.

Referring to FIG. 5, besides the components described above, the receive path 92 may also include one or more first-in-first-out (FIFO) memories 106 to temporarily store the incoming packets through the receive path 92. A checksum engine 108 (of the receive path 92) may be coupled between the FIFO memory(ies) 106 and the PCI interface 130 for purposes of verifying checksums that are embedded in the packets.

The receive path 92 may be interfaced to a PCI bus 72 via the PCI interface 130. The PCI interface 130 may include an emulated direct memory access (DMA) engine 131 that is used for purposes of transferring the data portions of the packets directly into the buffers 304 or 302 (when zero copy is not used). In this manner, the zero copy parser 110 may use one of a predetermined number (sixteen, for example) of DMA channels emulated by the DMA engine 131 to transfer the data into the appropriate buffer 304. In some embodiments, it is possible for each of the channels to be associated with a particular buffer 304. However, in some embodiments, when the protocol stack (instead of the zero copy parser 110) is used to transfer the data portions of the packets the DMA engine 131 may use a lower number (one, for example) of channels for these transfers.

In some embodiments, the receive path 92 may include additional circuitry, such as a serial-to-parallel conversion circuit 96 that may receive a serial stream of bits from a network interface 90 when a packet is received from the network wire 53. In this manner, the conversion circuit 96 packages the bits into bytes and provides these bytes to the receive parser 98. The network interface 90 may be coupled to generate and receive signals to/from the network wire 53.

In addition to the receive path 92, the network controller 52 may include other hardware circuitry, such as a transmit path 94, to transmit outgoing packets to the network. In the transmit path 94, the network controller 52 may include a transmit parser 114 that is coupled to the PCI interface 130 to receive outgoing packet data from the computer system 50 and form the header on the packets. To accomplish this, in some embodiments, the transmit parser 114 stores the headers of predetermined flows in a header memory 1 16. Because the headers of a particular flow may indicate a significant amount of the same information (port and IP addresses, for example), the transmit parser 114 may slightly modify the stored header for each outgoing packet and assemble the modified header onto the outgoing packet. As an example, for a particular flow, the transmit parser 114 may retrieve the header from the header memory 116 and parse the header to add such information as sequence and acknowledgment numbers (as examples) to the header of the outgoing packet. A checksum engine 120 may compute checksums for the IP and network headers of the outgoing packet and incorporate the checksums into the packet.

The transmit path 94 may also include an authentication and encryption engine 126 that may encrypt and/or authenticate the data of the outgoing packets. In this manner, all packets of a particular flow may be encrypted and/or authenticated via a key that is associated with the flow, and the keys for the different flows may be stored in a key memory 124. In some embodiments, new keys may be added to the key memory 124 and existing keys may be modified or deleted by information passed through the transmit path 94 via fields of a control packet. The transmit path 94 may also include one or more FIFO memories 122 to synchronize the flow of the packets through the transmit path 94. A parallel-to-serial conversion circuit 128 may be coupled to the FIFO memory (ies) 122 to retrieve packets that are ready for transmission for purposes of serializing the data of the outgoing packets. Once serialized, the circuit 128 may pass the data to the network interface 90 for transmission to the network wire 53.

Figure 9:
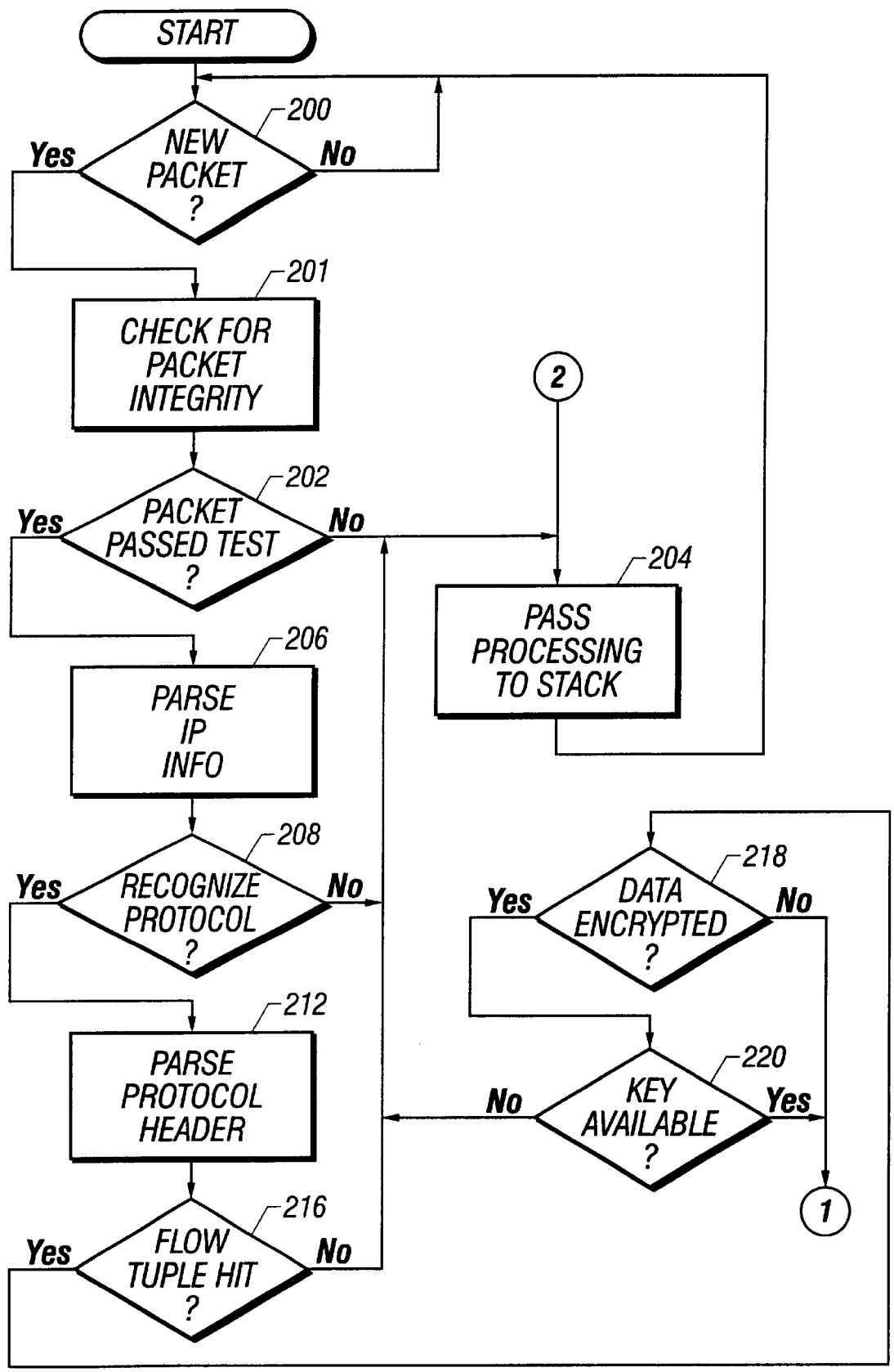
FIG. 9 is a flow diagram illustrating parsing of packet data by a receive parser of the network controller of FIG. 5.

In some embodiments, the receive 98 and zero copy 110 parsers may include one or more state machines, counter(s) and timer(s), as examples, to perform the following functions for each incoming packet. In the following, it is assumed that the particular flow being described is a zero copy flow. However, the flow may or may not be a zero copy flow in some embodiments. Referring to FIG. 9, the receive parser 98 may parse (block 200) the header of each incoming packet. From the parsed information, the receive parser 98 may determine if the packet needs authentication or decryption, as indicated in diamond 201.

If authentication or encryption is needed, then the receive parser 98 may use the parsed information from the header to determine (diamond 216) if a flow tuple hit has occurred. If not, the receiver parser 98 transfers control to the zero copy parser 110 that performs end of packet checks, as depicted in block 202. Otherwise, the receive parser 98 determines if the associated key is available in the key memory 104, as depicted in diamond 220. If the key is available, then the receive parser 98 may start authentication and/or decryption of the packet as indicated in block 218 before passing control to the zero copy parser 110 that may perform a zero copy of the packet, as indicated in block 202. If the key is not available, the receive parser 98 may transfer control to the zero copy parser 110 to perform a zero copy operation, as indicated in block 202.

After performing the zero copy operation (block 202), the zero copy parser 110 may perform end of packet checks, as indicated by block 204. In these checks, the receive parser 98 may perform checks that typically are associated with the data link layer. For example, the receive parser 98 may ensure that the packet indicates the correct Ethernet MAC address, no cyclic redundancy check (CRC) errors have occurred, no receive status errors (collision, overrun, minimum/maximum frame length errors, as examples) have occurred and the length of the frame is greater than a minimum number (64, for example) of bytes. The receive parser 98 may perform checks that typically are associated with the network layer. For example, the receive parser 98 may check on the size of the IP packet header, compute a checksum of the IP header, determine if the computed checksum of the IP header is consistent with a checksum indicated by the IP header, ensure that the packet indicates the correct IP destination address and determine if the IP indicates a recognized network protocol (the TCP or UDP protocols, as examples). The receive parser 98 may also perform checks that are typically associated with functions that are performed by the processor's execution of software that is associated with the transport layer. For example, the receive parser 98 may determine if the size of the protocol header is within predefined limits, may compute a checksum of the protocol header, and may determine if flags called ACK, URG, PSH, RST, FIN and/or SYN flags are set. If the PSH flag is set, then the receiver parser 98,may indicate this event to the driver program. If the RST, FIN or SYN flags are set, the receive parser 98 may surrender control to the transport layer. If the ACK flag is sent, then the receive parser 98 may interact either with the driver program 57 or the transmit path 94 to transmit an acknowledgment packet, as further described below.

After the checks are complete, the zero copy parser 110 may determine (diamond 205) whether a data link layer occurred, an error that may cause the packet to be unusable. If this is the case, then the zero copy parser 110 may reclaim (block 205) the memory that the driver program allocated for the packet, reclaim (block 207) the memory that was allocated for zero copy of the packet and reset (block 209)

the DMA channel (emulated by the DMA engine 131) that was associated with the packet. Otherwise, the zero copy parser 110 compiles an error statistics stack for the protocol stack.

Figure 10:
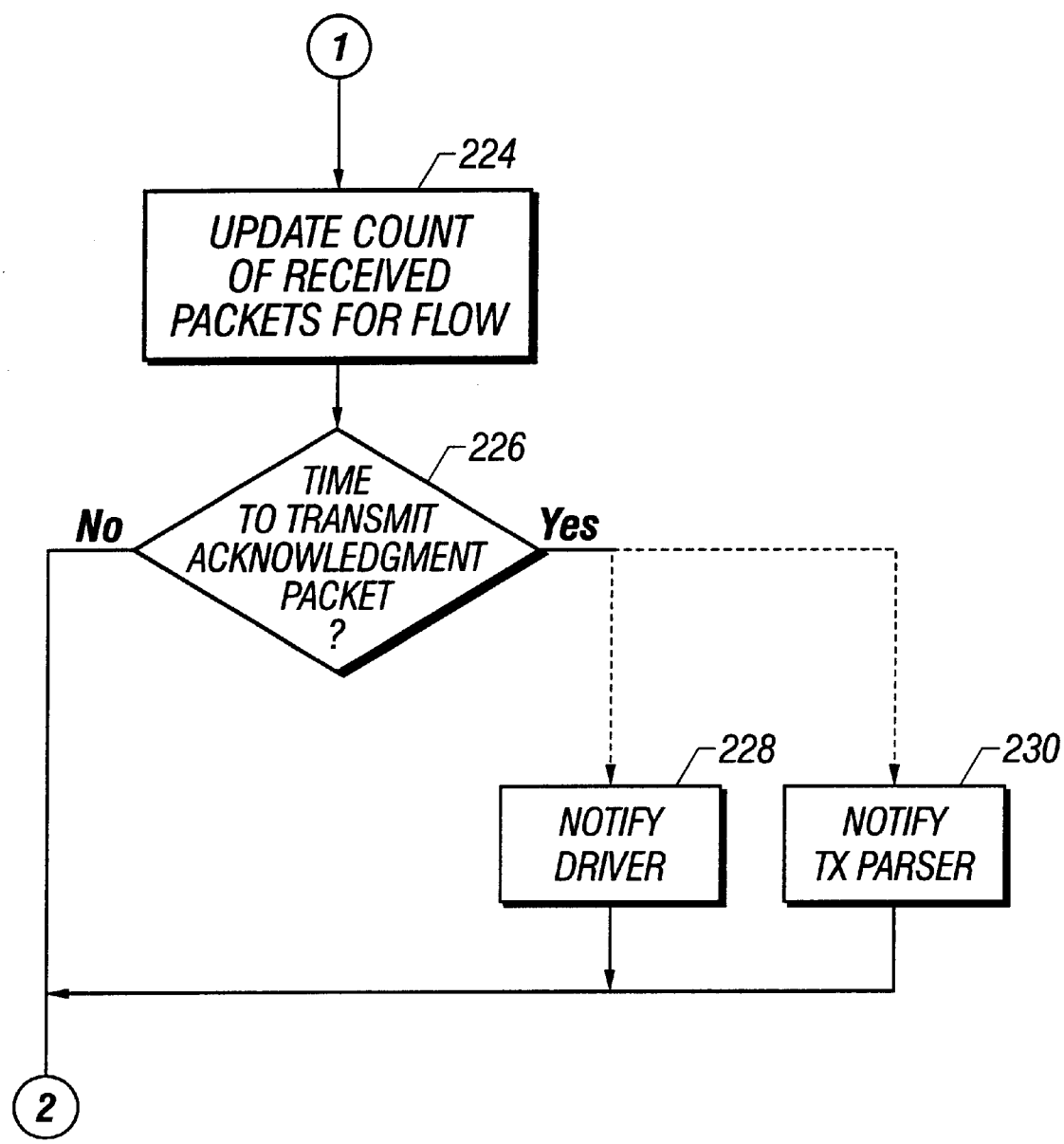
FIGS. 10 and 12 are flow diagrams illustrating operation of a zero copy parser of the network controller of FIG. 5 according to an embodiment of the invention.

Referring to FIG. 10, the zero copy parser 110 may perform the following functions to perform a zero copy operation. First, the zero copy parser 110 may determine the memory address at which to store the data, as further described below. Next, the zero copy parser 110 may determine (diamond 258) whether a packet is missing, and if so, the zero copy parser 110 reserves (block 260) memory space for the missing packet. The zero copy parser 110 subsequently performs (block 262) a zero copy operation to copy the packet into the memory 56.

Next, the zero copy parser 110 may update (block 264) a count of received packets for the flow. The zero copy parser 110 then determines (diamond 266) whether it is time to transmit an acknowledgment packet back to the sender of the packet based on the number of received packets in the flow. In this manner, if the count exceeds a predetermined number, then the receive parser 98 may either (depending on the particular embodiment) notify (block 268) the driver program 57 (see FIG. 4) or notify (block 270) the transmit parser 114 of the need to transmit an acknowledgment packet. Thus, in the latter case, the transmit parser 114 may be adapted to generate an acknowledgment packet, as no data for the data portion may be needed from the application layer. The receive parser 98 transitions from either block 268 or 270 to diamond 200 (see FIG. 9) to check for another received packet. After an acknowledgment packet is transmitted, the receive parser 98 may clear the count of received packets for that particular flow.

Figure 11:
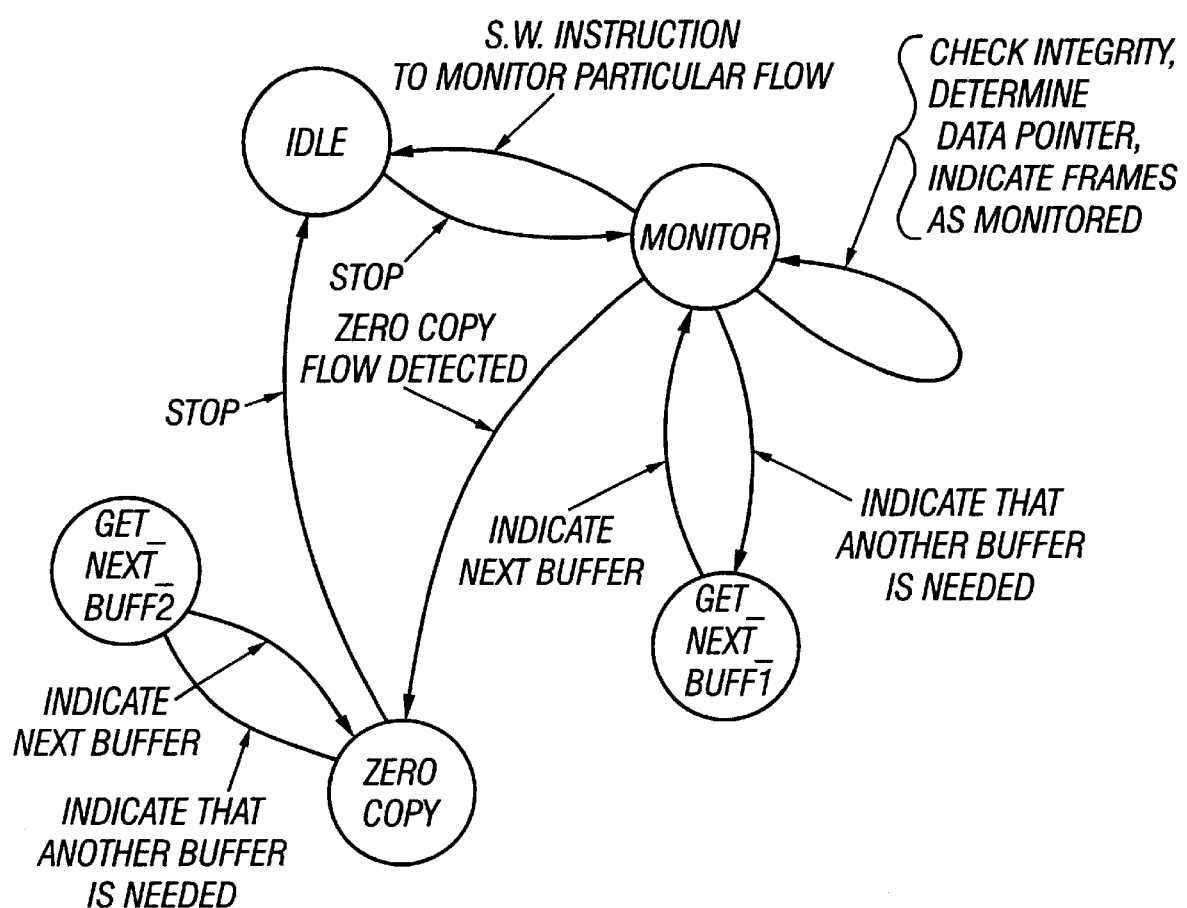
FIG. 11 is a state diagram illustrating operation of the network controller of FIG. 5 according to an embodiment of the invention.

A state diagram that illustrates transfer of control from the stack to the network controller 52 in a synchronized manner, per flow, of the receive path 92 is illustrated in FIG. 11. When the software that is associated with the network protocol stack is handling the parsing and processing of the packets, then the receive path 92 remains in an IDLE state. However, in some embodiments, although the transport layer may be executed by the processor 54 to initially handle the packets, subsequently control of the processing may be transferred to the network controller 52. In this manner, the processor 54, through execution of the driver program 57, may interact with the PCI interface 130 to place the receive path 92 in a MONITOR state.

In the MONITOR state, the receive parser 98 checks the integrity of the incoming packets that are associated with predetermined flows (as indicated by the flow tuples 140) and indicates the results of the check, as described above. For each predetermined flow to be monitored, the memory 100 may store an information field 141 that is associated with the flow. As an example, the information 141 may indicate a handle that indicates the flow to the network stack, a TCP sequence number (as an example) and a pointer to the appropriate network layer buffer 302 (when zero copy is not used). If the receive parser 98 needs a pointer to another buffer 302, then the receive parser 98 may notify the driver program 57 that (in a GET_NEXT_BUFF1 state), in turn, provides the pointer to the next buffer 302, and in response, the receive parser 98 may update the associated field 141. The GET_NEXT_BUFF1 state is related to buffers 304 and is used in the case when zero copy is used. This state machine and this particular state transition may not be used in some embodiments. The stack may also communicate to the network controller 52 to start zero copy from sequence number X or greater than X and from memory address Y that corresponds to that X, thus eliminating this synchronization process.

If the zero copy parser 98 (by using the flow context indications 113) detects that packets from a particular flow are to be zero copied, then the network controller 52 transitions to a ZERO COPY state. In the ZERO COPY state, the zero copy parser 98 uses the information field 115 that is associated with each zero copy flow to identify such information as the handle that is passed to the network stack (to identify the flow) and the pointer to the appropriate application buffer 304. If a pointer to another buffer 304 is needed, then the zero copy parser 98 requests another pointer from the driver program 57. In response, the driver program 57 (in a GET_NEXT_BUFF2 state) transfers an indication of the pointer to the network controller 52 for use by the zero copy parser 110. In other embodiments it is the responsibility of the application or stack to provide enough buffers for a zero copy flow. In some embodiments, in case the network controller 52 runs out of buffers, the network controller 52 uses the software-based receive procedure. The zero copy parser 110, in response, may update the information field 115.

In some embodiments, the driver program 57 may cause the processor 54 to exit the MONITOR state or ZERO COPY state and return to the IDLE state. The driver program 57 may cause the processor 54 to interact with the PCI interface 131 to add/remove a particular flow context indication 113 to/from the memory 112 and may cause the processor 54 to add/remove a particular flow tuple 140 to/from the flow memory 100.

Figure 12:
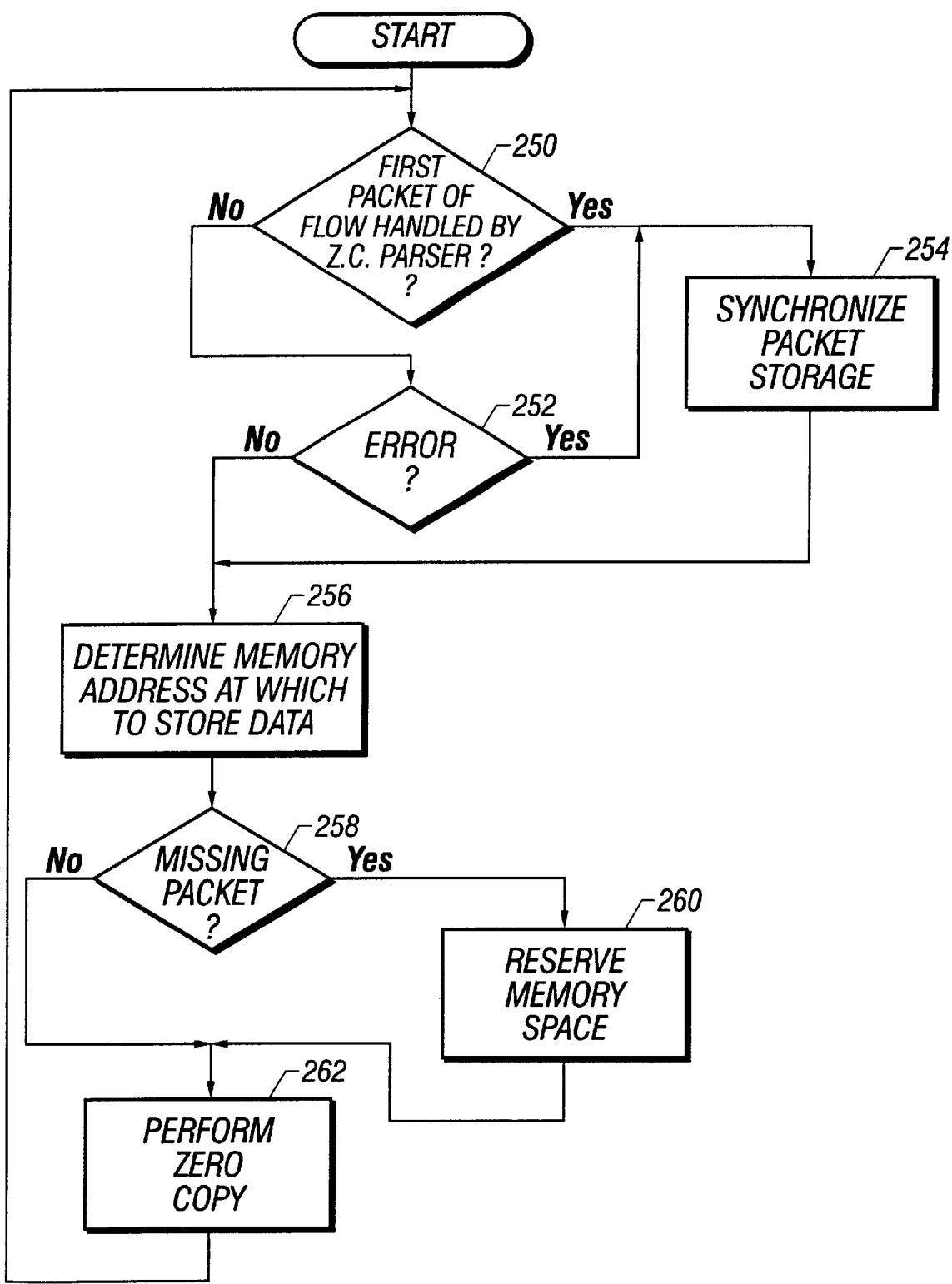

Referring to FIG. 12, in the performance of the zero copy operation, the zero copy parser may perform the following functions to transfer the packet data directly to the buffers 304. First, the zero copy parser 110 may determine if control of the transfer needs to be synchronized between the zero copy parser 110 and execution of the software that is associated with the layers (the data link and transport layers, as examples) of the network protocol stack. In this context, the term "synchronization" generally refers to communication between the stack and the zero copy parser 110 for purposes of determining a transition point at which one of the entities (the stack or the zero copy parser 110) takes control from the other and begins transferring data into the buffers 304. Without synchronization, missing packets may not be detected. Therefore, when control passes from the stack to the parser 110 (and vice versa), synchronization may need to occur, as depicted in block 254.

Thus, one scenario where synchronization may be needed is when the zero copy parser 110 initially takes over the function of directly transferring the data portions into the buffers 304. In this manner, if the zero copy parser 110 determines (diamond 250) that the current packet is the first packet being handled by the zero copy parser 110, then the parser 110 synchronizes the packet storage, as depicted by block 254. If not, the zero copy parser 110 determines (diamond 252) if an error has occurred, as described below. For purposes of determining when the transition occurs, the zero copy parser 110 may continually monitor the status of a bit that may be selectively set by the driver program 57, for example. Another scenario where synchronization is needed is when an error occurs when the zero copy parser 110 is copying the packet data into the buffers 304. For example, as a result of the error, the stack may temporarily resume control of the transfer before the zero copy parser 110 regains control. Thus, if the zero copy parser 110 determines (diamond 252) that an error has occurred, the zero copy parser 110 may transition to the block 254.

Synchronization may occur in numerous ways. For example, the zero copy parser 110 may embed a predetermined code into a particular packet status information to indicate to the stack that the zero copy parser 110 handles the transfer of subsequent packets. The stack may do the same.

Occasionally, the incoming packets of a particular flow may be received out of sequence. This may create a problem because the zero copy parser 110 may store the data from sequential packets one after the other in a particular buffer 304. For example, packet number "267" may be received before packet number "266," an event that may cause problems if the data for packet number "267" is stored immediately after the data for packet number "265." To prevent this scenario from occurring, in some embodiments, the zero copy parser 110 may reserve a region 308 (see FIG. 7) in the particular buffer 304 for the missing packet data, as indicated in block 260 (FIG. 11). For purposes of determining the size of the missing packet (and thus, the amount of memory space to reserve), the zero copy parser 110 may use the sequence numbers that are indicated by the adjacent packets in the sequence. In this manner, the sequence number indicates the byte number of the next successive packet. Thus, for the example described above, the acknowledgment numbers indicated by the packet numbers "265" and "267" may be used to determine the boundaries of the region 308.

The zero copy parser 110 subsequently interacts with the PCI interface 130 to set up the appropriate DMA channel to perform a zero copy (step 262) of the packet data into the appropriate buffer 304. The zero copy parser 110 determines the appropriate buffer 304 via the destination port that is provided by the receive parser 98.

Referring back to FIG. 4, besides the network controller 52, the computer system 50 may include a processor 54 that is coupled to a host bus 58. In this context, the term "processor" may generally refer to one or more central processing units (CPUs), microcontrollers or microprocessors (an X86 microprocessor, a Pentium microprocessor or an Advanced RISC Controller (ARM), as examples), as just a few examples. Furthermore, the phrase "computer system" may refer to any type of processor-based system that may include a desktop computer, a laptop computer, an appliance or a set-top box, as just a few examples. Thus, the invention is not intended to be limited to the illustrated computer system 50 but rather, the computer system 50 is an example of one of many embodiments of the invention.

The host bus 58 may be coupled by a bridge, or memory hub 60, to an Accelerated Graphics Port (AGP) bus 62. The AGP is described in detail in the Accelerated Graphics Port Interface Specification, Revision 1.0, published in Jul. 31, 1996, by Intel Corporation of Santa Clara, Calif. The AGP bus 62 may be coupled to, for example, a video controller 64 that controls a display 65. The memory hub 60 may also couple the AGP bus 62 and the host bus 58 to a memory bus 61. The memory bus 61, in turn, may be coupled to a system memory 56 that may, as examples, store the buffers 304 and a copy of the driver program 57.

The memory hub 60 may also be coupled (via a hub link 66) to another bridge, or input/output (I/O) hub 68, that is coupled to an I/O expansion bus 70 and the PCI bus 72. The I/O hub 68 may also be coupled to, as examples, a CD-ROM drive 82 and a hard disk drive 84. The I/O expansion bus 70 may be coupled to an I/O controller 74 that controls operation of a floppy disk drive 76 and receives input data from a keyboard 78 and a mouse 80, as examples.

Other embodiments are within the scope of the following claims. For example, a peripheral device other than a network controller may implement the above-described techniques. Other network protocols and other protocol stacks may be used.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method for use with a computer system, comprising:
    receiving a packet that includes a header, the header indicating at least one characteristic that is associated with a layer of a multiple layer protocol stack;
    parsing the packet with a network controller to extract said at least one characteristic; and
    passing a handle from the network controller to indicate said at least one characteristic.

2. The method of claim 1, wherein the act of passing comprises:
    passing the handle to another layer of the protocol stack.

3. The method of claim 1, wherein said at least one characteristic comprises:
    a port number associated with an application program.

4. The method of claim 1, wherein the layer comprises a data link layer.

5. The method of claim 1, wherein said at least one characteristic comprises:
    a type of the packet.

6. The method of claim 1, wherein the handle associates the packet with a flow.

7. The method of claim 1, further comprising:
    selectively transmitting acknowledgement packets based on said at least one characteristic.

8. The method of claim 1, further comprising: storing data associated with the packet in a region of memory that is used by execution of an application based on said at least one characteristic.

9. The method of claim 1, wherein the layer comprises a transport layer.

10. The method of claim 1, wherein the act of receiving comprises:
    receiving the packet from a network.

11. The method of claim 1, further comprising:
    determining whether a security key is available for the packet; and
    processing of the packet based on the determination.

12. The method of claim 11, wherein the act of processing comprises:
    decrypting data of the packet.

13. The method of claim 11, wherein the act of processing comprises:
    encrypting data of the packet.

14. The method of claim 11, further comprising:
    using said at least one characteristic to check an integrity of the packet.

15. An apparatus for use with a computer system capable of executing software of a protocol stack to extract at least one characteristic of a packet, comprising:
    an interface adapted to receive the packet, the packet including a header indicating said at least one characteristic; and
    a circuit adapted to:
        parse the header to extract said at least one characteristic of the packet without causing the computer system to execute the software, and
        process the packet based on the extracted characteristic.

16. The apparatus of claim 15, wherein said at least one characteristic comprises:

a port number being associated with an application program.

17. The apparatus of claim 15, wherein said at least one characteristic comprises:

a security attribute associated with the packet.

18. The apparatus of claim 15, wherein said at least one characteristic comprises:

a type of the packet.

19. The apparatus of claim 15, wherein the circuit is further adapted to:

use said at least one characteristic to associate the packet with a flow.

20. The apparatus of claim 15, wherein the circuit is further adapted to:

determine whether a security key is available for the packet; and further base the processing of the packet based on the determination.

21. The apparatus of claim 15, wherein the apparatus comprises a network controller.

22. A computer system comprising:

a processor adapted to execute software of a network stack to extract at least one characteristic of a packet; and a peripheral device adapted to:

receive the packet, the packet including a header indicating said at least one characteristic, parse the header to extract said at least one characteristic, and at least partially process the packet based on the at least one extracted characteristic.

23. The computer system of claim 22, wherein the software comprises a network layer.

24. The computer system of claim 22, wherein said at least one characteristic comprises:

a port number associated with an application program.

25. The computer system of claim 22, wherein said at least one characteristic comprises:

a security attribute being associated with the packet.

26. The computer system of claim 22, wherein said at least one characteristic comprises:

a type of the packet.

27. The computer system of claim 22, wherein the peripheral device is further adapted to:

use said at least one characteristic to associate the packet with a flow.

28. The computer system of claim 22, wherein the peripheral device is further adapted to:

determine whether a security key is available for the packet; and further base the processing of the packet based on the determination.

29. The computer system of claim 22, wherein the peripheral device comprises a network controller.

* * * * *